3,226,085
ROTARY TURBINE
Herbert Bachl, Turkenstrasse 40/II, Munich, Germany
Filed Oct. 1, 1962, Ser. No. 227,477
3 Claims. (Cl. 253—164)

My invention relates to a rotary turbine for expanding or compressing gaseous substances or mixtures of gaseous media with liquid and in certain cases also with finely dispersed solid particles.

Radial flow turbines are known where the working medium is guided primarily in an axial direction in the region of the axis of rotation, and primarily radially in the range of increasing circumferential speed. In general, the medium flows in power engines of this type in a centripetal direction and on processing machines of this type in a centrifugal direction, but in special cases also in the opposite direction. In these known turbines, there is a difference in the speed of revolution between the guide and the rotor system, the guide system rotating slower than the rotor system. In most cases, however, the guide system remains stationary, and in some cases even runs in the opposite direction from the rotor system. For the sake of simplicity, the parts which contain the guide-system are referred to as stationary or fixed parts, while the portion equipped with the rotor system is called the rotor apparatus. In describing the invention herein the guide system will be referred to as the stationary part of the turbine, and the rotor system portion will be referred to as the revolving or rotary portion. Correspondingly, guide elements, such as guide apparatus, guide vanes, refer herein to the stationary turbine part; while the rotor apparatus, i.e. rotor, blades, etc., belong to the rotary portion.

Engines of such radial-flow types have been used in practice for certain characteristic ranges. Within certain speed ranges and for certain throughputs it is possible to achieve high efficiencies with such devices. However, these engines require high expenditures of material and space and have a large number of pressure-stage gradients; that is, a limited high speed per stage, and achieve only limited efficiencies. For this reason radial flow-turbines of this type are generally subdivided, in the case of those with relatively large pressure gradients, into several stages in the radial direction, the direction of flow being centrifugal or alternately centripetal and centrifugal.

Unlike the customary types of turbines where blades are used for guiding and supporting the flow both in the stationary and in the rotary part, a turbine is already known where the gaseous or vaporous medium is guided in the rotor by closed channels in the latter. In such known turbine, the medium enters the rotor tangentially in the closed channels, traveling in a circumferential direction, and leaves the rotor again, likewise tangentially but in the opposite direction. The inlet and outlet points of the flow on the rotor are connected with each other by a closed channel which is arranged inside the rotor apparatus, and which deflects the working medium by an angle of about 180 degrees in a projection on a plane tangential to the rotor. In a special turbine of this type, the channel is continuously bent, in addition to this curvature in the tangential plane, in the projection on a plane perpendicular to the axis of rotation when entering the rotor, and away from the axis of rotation when leaving the rotor, so that the flow describes a constant spherical curve whose representation requires at least two curvature radii in different planes perpendicular to each other, of which at least one radius of curvature is twice as long as the mean diameter of the channel. A further development of this engine consists in that the channel cross section, which is terminated by a constantly curved line, in the guide portion and in the rotor portion, passes over steadily ahead of the opening into a cross section which is terminated at the opening by a curved line and by a straight line of constant length.

These so-called "tangential" flow turbines can be operated in wide speed ranges and for different loads. The tangential flow turbines are particularly suitable for high stage gradients and limited high speeds. But generally they do not attain the high efficiency of the known above-described radial-flow and axial-flow turbines, because the channels inside the rotor have sections where flow losses occur without any contribution to the transformation of energy.

It is therefore an object of my invention to overcome these disadvantages of the prior art and to provide a high-efficiency tangential turbine wherein little or no loss of energy takes place in the channel sections.

To these ends, and in accordance with one feature of my invention, channel sections are avoided in which no transformation or only a minor transformation of energy takes place.

According to another feature of the invention, the channels of the runner, starting axially and/or radially in the vicinity of the axis of rotation, are constantly deflected in the range of increasing circumferential-speed into a tangential direction, and the opening cross sections of the channels terminate in the range of the outside diameter of the runner tangentially or in an angle slightly deviating from the tangent. This results in a turbine which utilizes the radial flow principle in the range of low circumferential speeds, while the tangential flow principle is limited to the range of high circumferential speeds.

In the presently known radial-flow and axial-flow turbines, guide channels are mostly provided, which can be realized with cross-sections alternating in the direction of flow acting in this case as nozzles or diffusors; that is, they contribute to the transformation between kinetic and potential energy. They extend from the outside diameter of the runner substantially in radial direction and require therefore a high expenditure of space and material. These guide channels also increase, however, the flow losses and the formation of noise.

According to another, more specific, feature of my invention, the transition range between two runner stages are so designed that the interposition of closed guide channels is completely eliminated, at least between a runner and a collecting main duct in the stationary portion. The working medium in the collecting main duct is caused to pass along a spiral, helical or worm-shaped flow path into the next stage which leads the current back to the axis as a runner or guide wheel.

In tangential flow turbines, the tangential design of the channel openings on the outer circumference of the runner may be considered as disadvantageous when the walls of the channels terminate in thin edges which are highly stressed by the centrifugal force, so that high circumferential speeds cannot be achieved for reasons of strength.

According to another feature of my invention, these latter difficulties can be eliminated, for example, by designing the channels which carry the working medium in the outer range of the rotor so that they terminate in the axial direction, and sufficient overlapping remains on the circumference of the runner for strength purposes so as to achieve high circumferential speeds. The axial flow in the outer range of the runner can be limited here to an axial component of a primarily spiral, helical or worm-shaped flow. The limiting edge of the tangential channel section can also be divided or transformed into one or more blade arrangements, leading over into the axial direction of flow.

The foregoing and more specific objects and features of my invention will be described in the following with reference to embodiments of rotary turbines according to the invention illustrated by way of example on the accompanying drawings in which.

The figures illustrate the main parts of the various embodiments necessary for the understanding of the invention, in a greatly simplified and schematic representation. Identical or functionally similar components are denoted by the same reference numerals.

Figure 1:
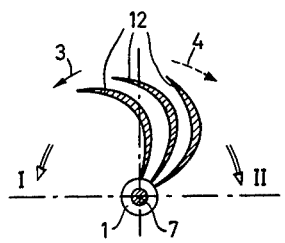
FIG. 1 is a fragmentary axial section through the turbine blades and shaft of a turbine according to the invention, and taken along the line 1—1 of FIGS. 2 and 4.

The embodiment represented in FIG. 1 shows a fragmentary cutout from an axial section. The parts of this machine which rotate in the lower circumferential speed range, in a manner similar to known radial-flow turbines, comprise an axial inlet 1 at the axis of rotation or in the range of the axis of rotation. In the present case this inlet is concentric with the drive shaft 7. Also similar to known radial-flow turbines are blades 12, radially mounted relative to inlet 1. However, according to the invention, the blades 12 are so shaped that the interspaces between them are curved in the range of increasing circumferential speed with a constant deflection, and these spaces change in cross section to form channels 9 (FIG. 2) whose cross sectional openings, defined by blades 12, terminate tangentially at the outside diameter of the rotor, or with an angle slightly deviating from the tangent.

The schematic representations in the figures illustrate only directions of flow and rotation, without showing unnecessary details, such as the form of the cross section of the channels or the packing elements between the successive stages etc. In all figures, stationary elements have been represented in black, and rotary elements are shown hatched.

In contrast to the known turbines with blade runners, in the turbine according to the invention, a rotor is provided with channels 9 arranged in its interior. Such rotor provided with channels differs from known blade rotors primarily by a relatively great thickness of material in the central part of the curved blade.

As shown in the radial sector shown in FIG. 1, in the centrifugal flow direction, at first the flow is only the axial inflow at 1 and then initially in the radial direction, the flow then continuing tangentially to the outer tips of blades 12, so that the working medium flows off immediately from the tangential channel openings 9 into collecting mains located at the outer circumference of the runner blades 12 in the direction of the arrow 3.

Figure 2:
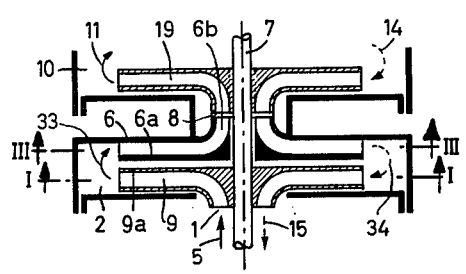
FIG. 2 is an axial longitudinal section through the turbine of FIG. 1.
Figure 4:
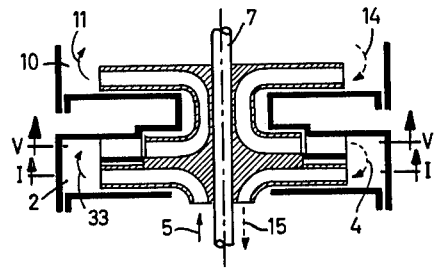
FIG. 4 is an axial longitudinal section through another embodiment of the invention, as compared to that of FIG. 2.

The collecting main duct, which is denoted by the numeral 2 in FIGS. 2 and 4, is arranged as an annular cavity radially outward of two coaxial cover surfaces 9a and 6a, 9a being rotatable and 6a being fixed. The duct 2 is substantially surrounded by fixed walls. The direction of flow in the rotating runner which forms channel 9 is assumed again as extending from the inside to the outside, so that the working medium flows in the collecting main duct 2 in the direction of the solid arrow 3 (FIG. 1). The machine operates in this case as a compressor. If the machine is to operate as a power engine, the working medium flows in the direction of the broken arrow 4 (FIG. 1). As a compressor, the blades 12 of the machine must rotate in the direction of the outlined arrow I (FIG. 1), whereas it rotates in the direction of the arrow II when it operates as a power engine driven by the working medium.

Figure 3:
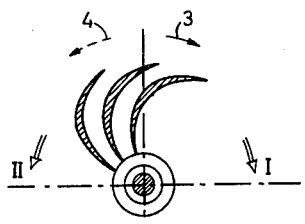
FIG. 3 is a radial section through the same turbine, taken along the line 3—3 of FIG. 2.

In the embodiment of the invention illustrated in FIG. 2 in an axial-section and in FIG. 3 in a radial section, the working medium arriving in the inlet 1 in the axial direction of the arrow 5 flows from the collecting main 2, after passing through the channels 9, in the direction of the arrow 33 into a stationary guide wheel 6 with tangentially mounted inner guide channels 6b, in which the medium is guided radially in the direction toward the axis of rotation and deflected there in an axial direction parallel to shaft 7 and arrow 5. At point 8, the working medium leaves the stationary channel 6b and enters the subsequent runner stage which comprises channels 19.

In the next stage the working medium passes through the radial channels 19, after entering axially from 8, and flows through tangential openings into the collecting mains 10 which follow. The working medium then flows in the direction of the arrow 11 to the next following stage.

The above-described structure, differs from known multiple-stage compressors by the absence of customarily-used guide elements extending in a radial direction away from the runner, and by the channel openings adjoining the collecting mains tangentially or with an angle slightly deviating from the tangent. Furthermore, the device according to the invention creates a spiral or helical direction of flow, while in the known radial flow-turbines there is a deflection in the stator by about 180 degrees in the axial section of the machine.

Figure 5:
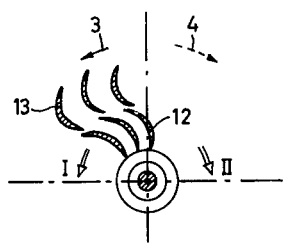
FIG. 5 is a radial section through the turbine of FIG. 4.

In the embodiment represented in FIGS. 4 and 5, guide elements 13 are arranged radially adjacent the blades 12, in the manner of the guide apparatus used in the Francis-turbine. These elements 13 guide the working medium from the outside inwardly to the runner blades 12, first in centripetal direction at the inlet, which becomes increasingly axial in the vicinity of the axis. This flow is joined finally in the same stage by a centrifugally traversed runner in the sense of the embodiment shown in FIGS. 1, 2 and 3.

It is also possible to connect stationary guiding channels or rotary channels to the radially outermost sides of the collecting mains 2 and 10 in the stationary part or to leave out the guiding channels altogether and to start the centrifugal runner stage at the collecting mains. In the latter case, the two rotary channels 9, 19, which are connected to the collecting mains 2, 10 and follow each other in the direction of flow would have to rotate in opposite direction. The tangential channels 6b connected to the collecting mains can have a slight curvature in the direction of flow, considered in a top view of the rotor and guide wheels, to facilitate the formation of a spiral flow.

If the turbine is to be used as a power engine for homogeneous working media, it is advisable to have the direction of flow corresponding to that indicated by the dotted-line arrows 34, 14, 15 (FIGS. 2, 4), and to have the direction of the rotation corresponding to the direction of the arrow I. This means a centripetal flow will take place in the runner, which enhances the expansion process.

If a power engine of one of the known types is employed additionally for separating condensed liquids from gases, then there is the danger that in the known tangential machines, having guide elements 13 located radially outwardly of the wheels, that the gases previously separated by centrifugal force in the channels of the runner blades 12 will mix again when entering the guiding channels of blades 13 and be separated only when deflected into the collecting mains 2, 10 at the expense of the energy of flow. If it is intended to combine the production of mechanical energy in a power engine with the separation of a mixture of gases and liquids and to centrifuge constituents condensed during the expansion, then according to a further feature of the invention, the channel cross sections between blades 13 can be so dimensioned larger than the channels between blades 12 so that an expansion takes place, even when using a centrifugal flow in the direction of the solid arrows 5, 33 and 11, so that the liquid droplets formed are thrown at the same time, due to the deflection in the tangential direction, by centrifugal force against the outer walls of the operating channels 9, 19. Due to the reaction force of the outflow from the channels between blades 12, the rotor turns in the direction of the arrow II. In the collecting mains 2, 10 the liquid droplets are thrown against the radially outermost wall and can be withdrawn to the outside, if necessary, enhanced by a stripping device (not shown).

The embodiment of the invention represented in FIGS. 4 and 5 has the advantage, when applied for the separation of liquid particles from gases, that the expansion process of one stage can be arranged, at least partly, in a wheel with centripetal flow direction.

If the machine is used as a compressor, apertures can be provided on the outer wall of the collecting mains, to inject, for example, liquids which mix with the original working medium and which form a new homogeneous substance under the action of increased pressure and temperature, or which, by evaporation of the liquid, reduce the temperature of the condensing operation, and hence its power consumption. In multi-stage machines, the collecting channel at the inlet to the first stage, or at the outlet from the last stage, can be designed as a vortex housing (spiral housing). Guiding channels may be interposed between this collecting main and the next adjacent running wheel. These guiding channels are preferably designed or shaped as nozzles or diffusers with an adjustable opening ratio. A regulating possibility of this type also exists for guiding channels which are arranged between the stages, for example, according to FIGS. 4 and 5, if the transition between the running and guiding channels at this point is likewise given an approximately tangential design.

Unlike the known tangential flow turbines, the generally rectangular cross sectional form need not change over into a round or oval cross section immediately after the channels enter the interior of the rotor. It can also be maintained rectangular when passing over into the axial part. Furthermore, the axes of the individual channels according to the invention are continuously curved, but not everywhere spherically curved, a primarily tangential, radial or axial flow direction following each other in the flow path. Not only the guide apparatus can be provided with a collecting main concentric with the axis of rotation, but also the rotor apparatus can contain a collecting main extending coaxially with the axis of rotation in an axial direction. In the tangential transition range a low-loss regulation can be provided by varying the opening ratio of the channels designed as nozzles or diffusers in the opening region.

Finally, according to another feature of the invention, it is also possible to combine a radial stage having centrifugal and centripetal flow with a common axial collecting main in the rotor in such a manner that a double stage with tangential inlet and tangential outlet is obtained as a special case. In the guiding channels, the flow is deflected by about 180 degrees, as viewed in the projection on the radial plane.

Figure 6:
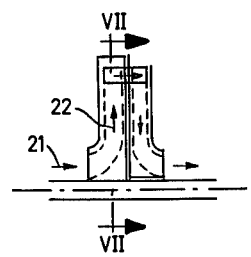
FIGS. 6, 7 and 8 illustrate schematically in fragmentary cross section further features of the invention and directions of flow through the channels.
Figure 7:
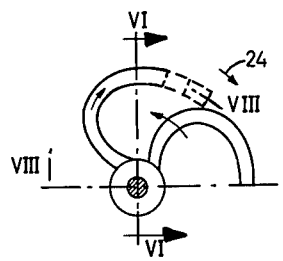
Figure 8:
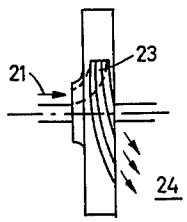

FIGS. 6, 7 and 8 show further features and modifications of the invention. The working medium enters axially here into the runner in the vicinity of the shaft in the direction of the arrow 21, and assumes a centrifugal direction of flow (see FIGS. 6, 8), and is here deflected, in a manner corresponding to the embodiments of FIGS. 1 to 5, into a radial and subsequently tangential flow, thus moving in the direction of the arrow 22 through the channels 23.

As it can be seen from FIG. 7, the channels are curved forward or backward, the transition to a tangential or approximately tangential section taking place in the vicinity of the outside diameter of the runner.

While in the embodiments according to FIGS. 1 to 5 the medium issues in a radial direction, in the embodiment of FIGS. 6 to 8 there is a deflection into an axial flow inside the runner so that the channels open, so to speak, tangentially on the front face of the runner. The working medium thus issues from the rotor in the direction of the arrow 24.

Correspondingly, the medium flows axially in the runner both in the range of the lowest as well as in the range of the highest peripheral speed. The axial flow may be limited to an axial component of a primarily radial, tangential or spiral flow. The limiting boundary edge of the tangential section, particularly as shown in FIG. 8, can be divided or changed into one or several axial blades.

The adjacent guide elements can be designed in various ways. Thus, they can be arranged in a disc form between the runner-guidewheel-stages with a likewise axial-tangential inlet on the outer periphery and with adjacent radial return channels to the axis of rotation. These channels are designed at the same time as nozzles or diffusers. However, the guide blades can also open axially or tangentially into a collecting main manifold to which the guideblades are joined axially, radially or tangentially.

Figure 9:
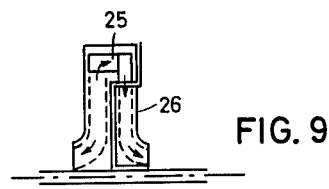
FIG. 9 shows schematically another embodiment of the invention wherein the collecting mains are designed as part of the rotor apparatus and taken along line IX—IX of FIG. 12.
Figure 11:
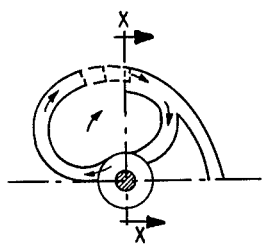
FIG. 11 is a view taken along line XI—XI of FIG. 10.

According to another feature of the invention, the collecting main manifold can be designed as part of the rotor apparatus to reduce the frictional losses, provided at least one component of the absolute speed on the runner outlet has the same direction as the peripheral speed. This is illustrated in FIGS. 9 and 11. Here the collecting main 25 is so designed that it bridges over the radially or tangentially mounted guide blades 26 of the following stage. The tangential outermost portion of the rotary channels can be curved, considered in a radial direction from the outside to the inside, at first axially in order to open them, and then curved toward the inside so that the transition to the rotor and guide apparatus again takes place on a cylindrical surface concentric with the axis of rotation, but between stationary guide elements and rotor elements bridging over them, and, if necessary, with the interposition of a collection ring.

Figure 10:
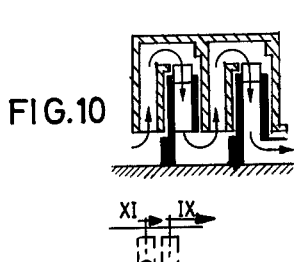
FIG. 10 illustrates another embodiment of the invention in axial section through the flow channels.
Figure 12:
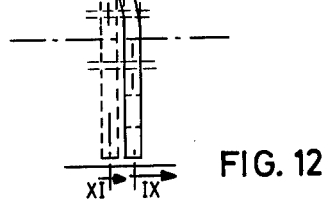
FIG. 12 is a side view of the flow channels of the turbine of FIGS. 9–11.

As shown in FIGS. 10 and 12, the channel openings can terminate radially or tangentially in this embodiment. As can be seen from FIGS. 10 and 11, several runner stages are combined in this embodiment into a closed rotor apparatus which rotates over the fixed shaft carrying the guide elements.

The word "tangential" as used herein defines flow in a direction tangent to a circle having a center on the defined axis.

It will be obvious to those skilled in the art, upon studying this disclosure, that devices according to my invention can be modified in various respects and hence may be embodied in apparatus other than that particularly illustrated and described herein, without departing from the essential features of my invention and within the scope of the claims annexed hereto.

I claim:

1. A rotary turbomachine having a plurality of stages wherein the working medium flows through the first rotor stage successively in a continuous spiral downstream direction fisrt axially, then radially and then tangentially relative to the rotational axis of the machine, and wherein the working medium then flows through a vaneless collecting chamber and stator in the same spiral downstream direction, the fluid leaving said vaneless collecting chamber and entering said stator tangentially, said fluid then being deflected radially and axially into a central opening of the next downstream rotor, respective stages of said machine having a stator and rotor with an intervening vaneless collecting chamber, said rotor having channel forming means defining a radial flow channel portion of guiding the medium approximately radially in the range near the rotational axis of said rotor, and defining a tangential flow channel tangent to a circle centered on said rotational axis for guiding the medium in the range of the outer diameter of said rotor, said channel forming means having a central axial opening communicating with said radial flow channel portion, said channel forming means further defining a tangential peripheral opening communicating with said intervening collecting chamber, said stator communicating with said intervening collecting chamber through said tangential peripheral opening, said stator having channel forming means shaped to continue the fluid flow from said collecting chamber in a continuous spiral downstream direction, said stator channel forming means defining a first outer tangential flow portion followed by an inner radial flow portion and terminating in a central opening communicating with a next successive stage.

2. A rotary compressor machine having a plurality of stages wherein the working medium flows through a first rotor stage in a continuous spiral downstream direction successively first entering axially, then flowing radially and then tangentially relative to the rotational axis of the machine, and wherein the working medium then flows through a vaneless collecting chamber and stator in the same spiral downstream direction, the fluid leaving said vaneless collecting chamber and entering said stator tangentially, said fluid then being deflected radially and axially into a central opening of the next downstream rotor, respective stages of said machine comprising a stator and rotor and an intervening vaneless collecting chamber, said rotor having channel forming means defining a tangential flow channel portion near the outer periphery of said rotor and forming a central axial rotor inlet opening and a radial flow channel portion between and communicating with said tangential portion and said central inlet opening, said rotor channel forming means further defining a tangential peripheral outlet opening communicating with said vaneless intervening collecting chamber, said stator communicating with said intervening collecting chamber through said tangential peripheral outlet opening, said stator having guide channel means shaped to smoothly continue the fluid flow from said vaneless collecting chamber in a continuous spiral downstream direction, said stator guide channel means defining an outer tangential flow portion followed by an inner radial flow portion and terminating in a central outlet opening communicating with a next successive stage.

3. A rotary turbo power machine having a plurality of stages wherein the working medium flows through a first rotor stage in a generally inward centripetal flow direction relative to the rotational axis of the machine in a continuous spiral downstream direction through successive stages; said fluid first entering the periphery of the first stage rotor tangential to the periphery thereof and flowing radially and centripetally therefrom to be discharged centrally adjacent the axis of the first rotor to enter an adjacent stator and to be discharged substantially tangentially to a circle of the rotational axis of the machine from the stator into an annular vaneless diffuser, and flow from said vaneless diffuser in a continuous spiral downstream direction into the periphery of the rotor of a second rotor stage, respective stages comprising a rotor, a stator and an annular vaneless diffuser, said rotor having channel forming means defining a tangential flow intake channel portion near the outer periphery of said rotor and a central axial discharge outlet, and a radial flow channel portion between and communicating with said tangential intake channel portion near the outer periphery of said rotor and said central outlet, said stator having a channel forming means comprising a central intake portion communicating with the central discharge outlet of said rotor and a radial outer portion terminating in a tangential discharge channel portion communicating with said annular vaneless diffuser and a substantially radial portion communicating between the intake portion of said stator and the discharge channel portion, whereby fluid flows in a continuous spiral stream in a downstream direction through the successive stages.

References Cited by the Examiner

UNITED STATES PATENTS

| | | | |
|---|---|---|---|
| 1,075,300 | 10/1913 | Moss | 230—127 |
| 1,845,190 | 2/1932 | Reich | 253—76 |
| 2,028,603 | 1/1936 | Heinze | 230—130 X |
| 2,265,806 | 12/1941 | Goldschmied | 253—55 X |
| 2,395,704 | 2/1946 | Wislicenus | 103—95 X |
| 2,548,465 | 5/1951 | Burdett et al. | 230—134.1 |
| 2,759,662 | 8/1956 | Carrier | 230—130 |
| 2,816,509 | 12/1957 | Rice | 103—108 |

FOREIGN PATENTS

| | | |
|---|---|---|
| 105,930 | 3/1927 | Austria. |
| 473,360 | 5/1951 | Canada. |
| 1,124,833 | 7/1956 | France. |
| 20,147 | 1903 | Great Britain. |
| 13,930 | 1914 | Great Britain. |
| 343,385 | 2/1931 | Great Britain. |
| 472,987 | 10/1937 | Great Britain. |
| 88,945 | 8/1921 | Switzerland. |

OTHER REFERENCES

Maschinenfabrik Augsburg-Nurnberg A.G., German application No. 1,004,332, printed Mar. 14, 1957.

DONLEY J. STOCKING, *Primary Examiner.*

WALTER BERLOWITZ, JOSEPH H. BRANSON, Jr.,
*Examiners.*